P. J. CUNNINGHAM.
TRUCK BLOCKING DEVICE.
APPLICATION FILED SEPT. 20, 1916.
1,220,322.
Patented Mar. 27, 1917.
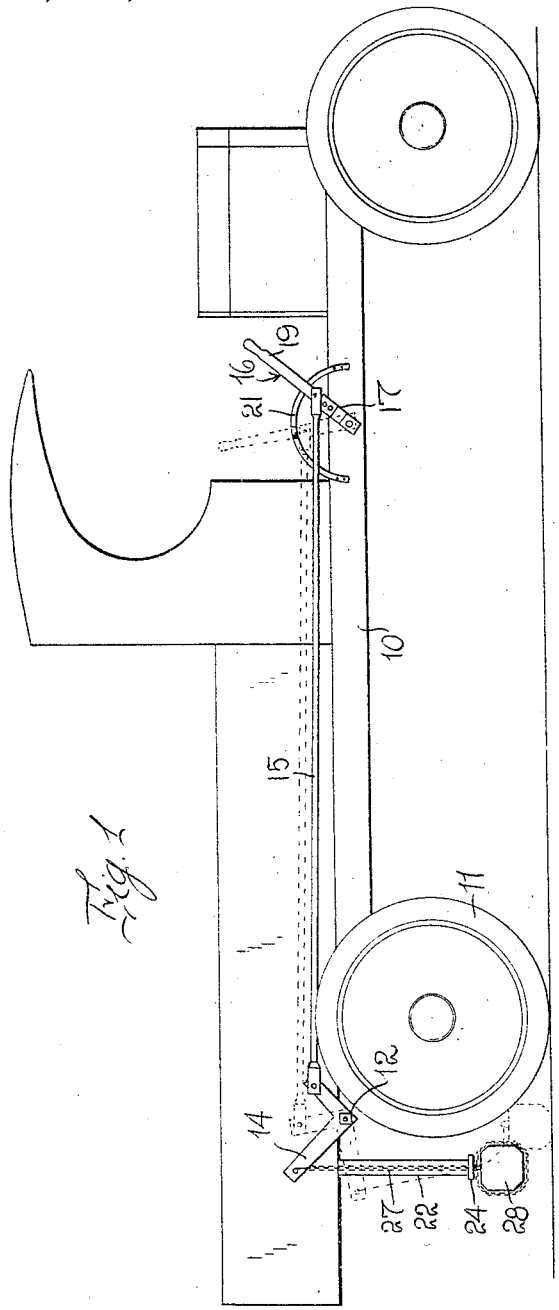
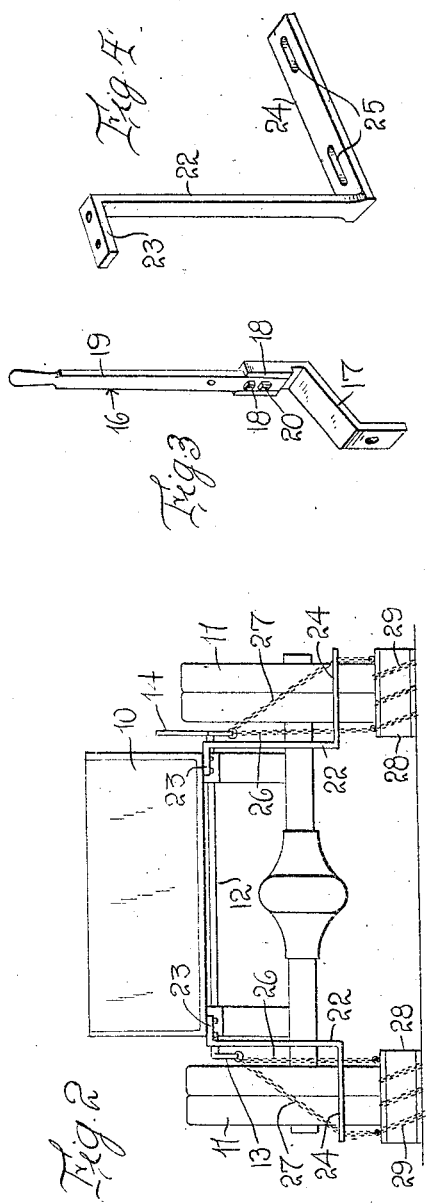
Inventor
P. J. CUNNINGHAM
By Watson E. Coleman
Attorney

UNITED STATES PATENT OFFICE.

PETER J. CUNNINGHAM, OF BATTLE MOUNTAIN, NEVADA.

TRUCK-BLOCKING DEVICE.

1,220,322.   Specification of Letters Patent.   Patented Mar. 27, 1917.

Application filed September 20, 1916.   Serial No. 121,256.

*To all whom it may concern:*

Be it known that I, PETER J. CUNNINGHAM, a citizen of the United States, residing at Battle Mountain, in the county of Lander and State of Nevada, have invented certain new and useful Improvements in Truck-Blocking Devices, of which the following is a specification, reference being had to the accompanying drawings.
This invention has relation to attachments for vehicles such as trucks and particularly to devices for blocking trucks.

Ordinarily with heavy trucks it is necessary, particularly when the truck is moving up grade, that whenever the truck stops the driver or an attendant jumps out of the vehicle and places a block behind the wheels. Where a great many stops are made, as in delivery trucks, this necessity of continually blocking the wheels is a nuisance and the object of my invention is the provision of means whereby the driver of the truck without leaving his seat may block the truck and then release the block or chock when he is ready to drive on.

A further object of the invention is the provision of a chocking or blocking device which is very simple, which may be easily attached to any ordinary vehicle of this type, and which will not wear the tires as would be the case if brakes were used.

Other objects will appear in the course of the following description.

My invention is illustrated in the accompanying drawings, in which,

Figure 1 is a side elevation of a truck with my attachment applied thereto;

Fig. 2 is a rear elevation of the truck and attachment.
Fig. 3 is a perspective view of the lever; and Fig. 4 is a perspective view of the guide 22.

Referring to these figures, 10 designates a truck of any ordinary or usual construction and illustrated as a motor truck provided with the rear wheels 11. Mounted upon the body of the truck in any suitable manner is a transverse shaft 12, provided at one end with the rearwardly extending arm 13 and at its other end with the bell crank 14 having an upwardly extending arm and a rearwardly extending arm. From the upwardly extending arm extends a connecting rod 15 which at its forward end is connected in any suitable manner to a lever 16, pivotally mounted upon the side of the truck adjacent the driver's seat. This lever may be of any suitable construction but I have illustrated it as angular in form and formed of two sections, the section 17 being provided at its upper end with inwardly turned flanges 18 forming a socket for the section 19 which is inserted in said socket and held in place by bolts 20. This style of lever permits of the ready removal of the lever or of the handle end thereof if necessity requires. The lever preferably moves over a rack or sector 21 with which it operatively engages in its raised or lowered positions.

Attached to the bottom of the truck, rearward of the wheels 11, are the L-shaped guides 22, each guide being formed with an attaching flange 23, a downwardly extending portion, and a laterally extending portion 24 formed with spaced slots 25. These guides are preferably formed of strap iron. Extending from the arm 13 and from the rearwardly extending arm on the bell crank 14 are the downwardly extending chains 26 and the downwardly and outwardly extending chains 27. The chains 26 extend directly downward through one slot in the portion 24 of the guide while the chain 27 extends outward and downward through the outer slot in the guide. At the lower ends these chains are connected to chocking blocks or chocks 28. These blocks are preferably about 12 inches in length and 6x6 in cross section with beveled corners. They may be of any other suitable form, however, and may be made of any suitable material but preferably of wood. Around each of these blocks is wrapped a chain or cable 29. Preferably there are a plurality of wrappings on the block so that the block will, to a certain extent, bite into the roadway when the block is lowered and will, to a certain extent, be impressed into the rubber tire so as to securely hold the tire and prevent the rotation of the wheel.

It will be obvious now that when it is desired to block the vehicle the lever 16 is shifted to lower the chocks 28 against the road. The chains 26 and 27 are sufficiently flexible to allow the wheels 11 to run back on the chocks. When, however, the chocking blocks are raised the guides 22 act to hold the blocks away from the tires of the wheels 11 and prevent the blocks from swinging against the tires.

It will be seen that this invention is very simple, that it may be applied to practically any form of truck and that by its use the truck can be chocked without the driver leaving his seat, thus doing away with the necessity of carrying an extra man on the truck in order to chock it on hills. This also does away with the necessity of cramping the car on city streets so that the rear wheel will engage with the curb in order to prevent the rear wheels from backing down hill and it does away with the necessity of putting on the brakes in order to hold the car which action wears the tires.

It will of course be understood that there is to be sufficient slack in the chain that when the block is on the ground the wheels will back up against it. Otherwise the block will move with the truck.

Having described my invention, what I claim is:

1. The combination with a truck having wheels, of guide members mounted on the truck, chocking blocks having flexible connections passing through said guide members, rocking members to which the flexible connections are connected, and manually operable means for rocking said members including a lever disposed adjacent the driver's seat.

2. The combination with a truck, of a rock shaft mounted on the truck having rearwardly extending arms, chains depending from said arms, guides through which said chains pass mounted upon the body of the truck, chocking blocks supported by said chains in operative relation to the wheels, a lever mounted on the truck, and an operative connection between said lever and said shaft.

3. The combination with a truck, of L-shaped guides mounted upon the bottom of the truck and projecting laterally therefrom rearward of certain wheels of the truck, the laterally projecting portions of the guides being slotted, a rock shaft mounted upon the truck and having a rearwardly extending arm on one end and a bell crank on the other, a pair of flexible connections extending from the rearwardly extending arm and from the bell crank passing down through said guides, chocking blocks attached to the flexible connections, a lever mounted upon the truck, and a connecting rod between said lever and the bell crank.

4. In a truck including a pair of wheels, chocking blocks supported for vertical movement behind said wheels, means for vertically shifting the chocking blocks into or out of operative position, and flexible members wrapped a plurality of times around the chocking blocks.

In testimony whereof I hereunto affix my signature in the presence of two witnesses.

PETER J. CUNNINGHAM.

Witnesses:
 WALTER J. GRINDLE,
 ABRAHAM WISE.